(12) United States Patent
Jacobs, III et al.

(10) Patent No.: US 7,381,347 B2
(45) Date of Patent: Jun. 3, 2008

(54) CROSSLINKING COMPOSITION

(75) Inventors: William Jacobs, III, Bethel, CT (US); Lon-Tang W. Lin, Bethel, CT (US)

(73) Assignee: Cytec Technology Corp., Wilmington, DE (US)

( * ) Notice: Subject to any disclaimer, the term of this patent is extended or adjusted under 35 U.S.C. 154(b) by 480 days.

(21) Appl. No.: 10/403,143

(22) Filed: Mar. 31, 2003

(65) Prior Publication Data

US 2004/0192851 A1  Sep. 30, 2004

(51) Int. Cl.
| | | |
|---|---|---|
| C08G 12/02 | (2006.01) | |
| C08G 12/06 | (2006.01) | |
| C08G 12/12 | (2006.01) | |
| C08G 12/38 | (2006.01) | |
| C09K 3/00 | (2006.01) | |

(52) U.S. Cl. ............ 252/182.26; 252/182.27; 252/182.13; 252/182.34; 525/256; 525/259; 544/192

(58) Field of Classification Search ............ 252/182.27; 525/256

See application file for complete search history.

(56) References Cited

U.S. PATENT DOCUMENTS

| | | | | |
|---|---|---|---|---|
| 3,420,799 A | | 1/1969 | Cavitt ............... | 260/67.6 |
| 3,744,970 A | * | 7/1973 | Swidler et al. ......... | 8/183 |
| 3,793,280 A | | 2/1974 | Sandler ............. | 260/29.4 R |
| 3,806,508 A | | 4/1974 | Weinrotter et al. ..... | 260/249.6 |
| 4,064,191 A | * | 12/1977 | Parekh .............. | 525/186 |
| 4,180,488 A | | 12/1979 | Stern et al. .......... | 260/21 |
| 4,454,133 A | | 6/1984 | Berke et al. .......... | 424/267 |
| 4,540,735 A | * | 9/1985 | Borovicka, Sr. ....... | 524/512 |
| 4,851,269 A | * | 7/1989 | Meyers et al. ........ | 427/428.01 |
| 5,276,130 A | * | 1/1994 | Bradford et al. ....... | 528/230 |
| 5,384,163 A | * | 1/1995 | Budde et al. ......... | 427/385.5 |
| 5,552,488 A | * | 9/1996 | Bradford et al. ....... | 525/163 |
| 5,821,323 A | * | 10/1998 | Bright et al. ......... | 528/254 |
| 5,866,202 A | | 2/1999 | Nastke et al. ......... | 427/213.34 |
| 5,939,195 A | * | 8/1999 | Allen et al. .......... | 428/413 |
| 6,268,440 B1 | * | 7/2001 | Kudo et al. .......... | 525/477 |

FOREIGN PATENT DOCUMENTS

| | | |
|---|---|---|
| EP | 0429830 A2 | 6/1991 |
| EP | 0532462 A2 | 3/1993 |
| GB | 494700 | 10/1938 |
| WO | WO 2006/017879 | 6/1996 |
| WO | WO 97/11119 | 3/1997 |

* cited by examiner

Primary Examiner—Joseph D. Anthony
(74) Attorney, Agent, or Firm—Todd E. Garabedian, Ph.D.; Wiggin and Dana LLP

(57) ABSTRACT

This invention relates to a crosslinking composition comprising a compound having the structure of Formula I:

A'-NR$^A$—R$^D$ where A' is a moiety derived from the group consisting of linear or cyclic ureas, cyanuric acid, substituted cyanuric acids, linear or cyclic amides, glycolurils, hydantoins, linear or cyclic carbamates and mixtures thereof, or a moiety comprising the structure:

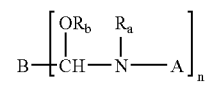

where R$^A$ is R$^D$, hydrogen, an alkyl of 1 to 20 carbon atoms, or taken together with A' forms a cyclic compound; R$^D$ is —CHR$^C$ OR$^B$, wherein R$^B$ is hydrogen, alkyl, aryl, aralkyl or an alkaryl having from 1 to about 24 carbon atoms and R$^C$ is an alkyl, halogenated alkyl, aryl, aralkyl, halogenated aralkyl, alkoxyalkyl or an alkaryl having from 1 to about 24 carbon atoms; A is a moiety derived from the group consisting of linear or cyclic ureas, cyanuric acid, substituted cyanuric acids, linear or cyclic amides, glycolurils, hydantoins, linear or cyclic carbamates and mixtures thereof; B is a residue of a poly(alkylaldehyde) with n aldehyde groups; n is an integer of 2 to about 8; R$_a$ is R$_d$, hydrogen, an alkyl of 1 to about 20 carbon atoms, or taken together with A forms a cyclic compound; where R$_d$ is CHR$_c$OR$_b$ or

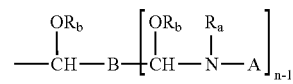

where R$_b$ is hydrogen, alkyl, aryl, aralkyl or an alkaryl having from 1 to about 24 carbon atoms and R$_c$ is an alkyl, halogenated alkyl, aryl, aralkyl, halogenated aralkyl, alkoxyalkyl or an alkaryl having from 1 to about 24 carbon atoms; and where the alkyl or aryl groups in each radical may optionally have heteroatoms in their structure. This invention also relates to a process for producing the crosslinking composition by reacting an amino compound containing amino groups; a mono(alkylaldehyde) and/or a poly(alkylaldehyde), and an alcohol; where said amino compound is selected from the group consisting of: linear or cyclic ureas, cyanuric acid, substituted cyanuric acids, linear or cyclic amides, glycolurils, hydantoins, linear or cyclic carbamates and mixtures thereof.

10 Claims, No Drawings

CROSSLINKING COMPOSITION

FIELD OF THE INVENTION

The invention is directed to aminoplast-based crosslinking compositions and their method of preparation. In particular, the invention relates to aminoplast-based crosslinking compositions, which are prepared by reacting amino compounds with mono(alkylaldehydes) and/or poly(alkylaldehydes) and alcohol.

BACKGROUND OF THE INVENTION

Traditional industrial coatings have for years been based in significant part on backbone resins having active hydrogen groups crosslinked with various derivatives of amino-1,3,5-triazines. Most notable among the amino-1,3,5-triazine derivatives are the aminoplasts such as the alkoxymethyl derivatives of melamine and guanamines which, while providing excellent results in a number of aspects, have the disadvantage of releasing formaldehyde as a volatile byproduct under curing conditions and requiring relatively high temperatures to adequately crosslink the film.

Despite the excellent film coating properties, which can be achieved with aminoplast crosslinked systems, the coatings industry is under great pressure to reduce the environmentally undesirable emission of formaldehyde. In addition, high temperature crosslinking systems require more energy to cure and/or crosslink slower resulting in less throughput. As a result, it has long been a desire of industry to find acceptable alternative crosslinkers and coatings systems, which emit no formaldehyde, or low amounts of formaldehyde, and cure at lower temperatures.

U.S. Pat. Nos. 3,806,508 and 4,180,488 disclose the preparation of resins prepared by reacting melamine with a mono(alkylaldehyde) and an alcohol. However, neither patent discloses nor teaches reacting a non-melamine based amino compound with a mono(alkylaldehyde) and/or poly(alkylaldehyde).

U.S. Pat. No. 4,454,133 discloses the preparation of antimicrobial compounds prepared by reacting an amide or imide compound with poly(alkylaldehydes), e.g., glutaraldehyde. However, the patent neither discloses nor teaches reacting an amino-based compound with mono(alkylaldehydes) and/or poly(alkylaldehydes) and alcohol to form a crosslinking composition.

SUMMARY OF THE INVENTION

This invention relates to a crosslinking composition comprising a compound having the structure of Formula I:

$$A'-NR^A-R^D \quad \text{Formula I}$$

where A' is a moiety derived from the group consisting of linear or cyclic ureas, cyanuric acid, substituted cyanuric acids, linear or cyclic amides, glycolurils, hydantoins, linear or cyclic carbamates and mixtures thereof, or a moiety comprising the structure:

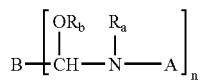

where $R^A$ is $R^D$, hydrogen, an alkyl of 1 to 20 carbon atoms, or taken together with A' forms a cyclic compound;

$R^D$ is $-CHR^C OR^B$, wherein $R^B$ is hydrogen, alkyl, aryl, aralkyl or an alkaryl having from 1 to about 24 carbon atoms and $R^C$ is an alkyl, halogenated alkyl, aryl, aralkyl, halogenated aralkyl, alkoxyalkyl or an alkaryl having from 1 to about 24 carbon atoms;

A is a moiety derived from the group consisting of linear or cyclic ureas, cyanuric acid, substituted cyanuric acids, linear or cyclic amides, glycolurils, hydantoins, linear or cyclic carbamates and mixtures thereof;

B is a residue of a poly(alkylaldehyde) with n aldehyde groups;

n is an integer of 2 to about 8;

$R_a$ is $R_d$, hydrogen, an alkyl of 1 to about 20 carbon atoms, or taken together with A forms a cyclic compound;

where $R_d$ is $CHR_c OR_b$ or

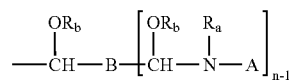

where $R_b$ is hydrogen, alkyl, aryl, aralkyl or an alkaryl having from 1 to about 24 carbon atoms and $R_c$ is an alkyl, halogenated alkyl, aryl, aralkyl, halogenated aralkyl, alkoxyalkyl or an alkaryl having from 1 to about 24 carbon atoms; and where the alkyl or aryl groups in each radical may optionally have heteroatoms in their structure.

This invention also relates to a process for producing the crosslinking composition by reacting an amino compound containing amino groups; a mono(alkylaldehyde) and/or a poly(alkylaldehyde), and an alcohol; where said amino compound is selected from the group consisting of: linear or cyclic ureas, cyanuric acid, substituted cyanuric acids, linear or cyclic amides, glycolurils, hydantoins, linear or cyclic carbamates and mixtures thereof.

DETAILED DESCRIPTION OF THE INVENTION

In the present invention, the term "mono(alkylaldehyde)" is an aldehyde having the general formula: $R_2-CHO$, where $R_2$ is alkyl, halogenated alkyl, aryl, aralkyl, halogenated aralkyl, alkoxyalkyl or an alkaryl, having from 1 to about 24 carbon atoms or about 1 to 12 carbon atoms or about 1 to 4 carbon atoms.

The term "poly(alkylaldehyde)" is an aldehyde having the general formula: $B-[-CHO]_n$, where B is a organic residue of a poly(alkylaldehyde) with n aldehyde groups and n is an integer of 2 to about 8. A non-limiting example of a poly(alkylaldehyde) is glutaraldehyde having the structure $OHC-(CH_2)_3-CHO$, where B is $-(CH_2)_3-$ and n is equal to 2.

The term "and/or" means either or both. For example, "A and/or B" means A or B, or both A and B.

The term "hydrocarbyl," as used herein, is a monovalent hydrocarbon group in which the valency is derived by extraction of a hydrogen from a carbon. Hydrocarbyl includes, for example, aliphatics (straight and branched chain), cycloaliphatics, aromatics and mixed character groups (e.g., aralkyl and alkaryl). Hydrocarbyl also includes groups with internal unsaturation and activated unsaturation. More specifically, hydrocarbyl includes, but is not limited to: alkyl, cycloalkyl, aryl, aralkyl, alkaryl, alkenyl, cycloalkenyl, and alkynyl, typically having from 1 to about 24 carbon atoms, preferably having from 1 to about 12 carbon atoms or 1 to about 4 carbon atoms. A hydrocarbyl may contain one or more carbonyl groups (which is/are included in the carbon count) and/or a heteroatom or heteroatoms (such as at least one oxygen, nitrogen, sulfur, or silicon) in the chain or ring. In addition, a hydrocarbyl may have one or more of the hydrogens of the hydrocarbon group replaced by a functional group commonly found in organic molecules. The phrase "functional group commonly found in organic molecules" means non-hydrocarbyl groups that are typically found in organic molecules including, but not limited to, halides, cyano groups, amino groups, thiol groups, carboxylate groups, hydroxyl groups, sulfonate groups, nitroso groups, nitro groups, and the like.

This invention relates to a crosslinking composition comprising a compound having the structure of Formula I:

   Formula I where A' is a moiety derived from the group consisting of linear or cyclic ureas, cyanuric acid, substituted cyanuric acids, linear or cyclic amides, glycolurils, hydantoins, linear or cyclic carbamates and mixtures thereof, or a moiety comprising the structure:

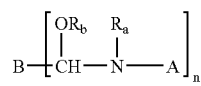

where $R^A$ is $R^D$, hydrogen, an alkyl of 1 to 20 carbon atoms, or taken together with A' forms a cyclic compound;
$R^D$ is $-CHR^C OR^B$, where $R^B$ is hydrogen, alkyl, aryl, aralkyl or an alkaryl having from 1 to about 24 carbon atoms and $R^C$ is an alkyl, halogenated alkyl, aryl, aralkyl, halogenated aralkyl, alkoxyalkyl or an alkaryl having from 1 to about 24 carbon atoms;
A is a moiety derived from the group consisting of linear or cyclic ureas, cyanuric acid, substituted cyanuric acids, linear or cyclic amides, glycolurils, hydantoins, linear or cyclic carbamates and mixtures thereof;
B is a residue of a poly(alkylaldehyde) with n aldehyde groups;
n is an integer of 2 to about 8;
$R_a$ is $R_d$, hydrogen, an alkyl of 1 to about 20 carbon atoms, or taken together with A forms a cyclic compound;
where $R_d$ is $CHR_c OR_b$ or

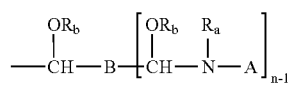

where $R_b$ is hydrogen, alkyl, aryl, aralkyl or an alkaryl having from 1 to about 24 carbon atoms and $R_c$ is an alkyl, halogenated aryl, aralkyl, halogenated aralkyl, alkoxyalkyl or an alkaryl having from 1 to about 24 carbon atoms; and wherein the alkyl or aryl groups in each radical may optionally have heteroatoms in their structure.

This invention also relates to a process for producing the crosslinking composition by reacting an amino compound containing amino groups; a mono(alkylaldehyde) and/or a poly(alkylaldehyde), and an alcohol; where said amino compound is selected from the group consisting of: linear or cyclic ureas, cyanuric acid, substituted cyanuric acids, linear or cyclic amides, glycolurils, hydantoins, linear or cyclic carbamates and mixtures thereof. The above reaction may be prepared in an one-step or multi-step process. Preferably, the reaction is carried out in a multi-step process where the amino compound is first reacted with the mono and/or poly(alkylaldehydes). The reaction product is then reacted with an alcohol, optionally in the presence of an acid catalyst.

Generally, one —NH group from the amino compound reacts with an aldehyde group in the mono- or poly(alklyaldehydes) as set forth below.

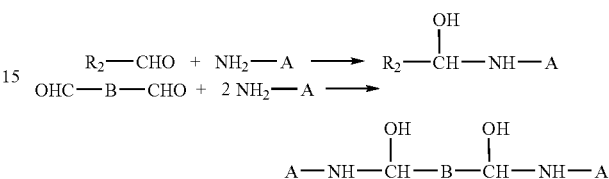

where A, B and $R_2$ are defined above.

During the etherification reaction, the hydroxyl groups may be etherified by the reacting alcohol ($R_1$—OH)

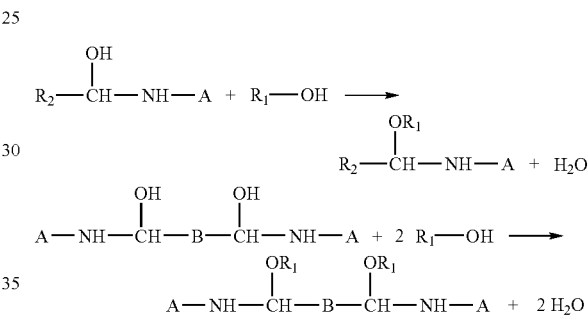

It should be noted that A and/or A' may be a monovalent or divalent radical depending on whether the amino group is linear or forms part of a cyclic ring respectively.

The table below illustrates the numerous and diverse amino compounds that may be used in this invention.

Linear Amino Compounds

| Name | Formula | A' or A moiety |
|---|---|---|
| Amides | $R-\overset{O}{\underset{\|}{C}}-NHR'$ | $R-\overset{O}{\underset{\|}{C}}-$ |
| Ureas | $RHN-\overset{O}{\underset{\|}{C}}-NHR'$ | $RHN-\overset{O}{\underset{\|}{C}}-$ |
| Carbamates | $R-O-\overset{O}{\underset{\|}{C}}-NHR'$ | $R-O-\overset{O}{\underset{\|}{C}}-$ |
| Triazines | (triazine with R, R', R' substituents) | (triazine with R, R', R' substituents) |

Cyclic Amino Compounds

| Name | Formula | A' or A moiety |
|------|---------|----------------|
| Hydantoins | ![hydantoin formula] | ![hydantoin moiety] |
| Glycolurils | ![glycoluril formula] | ![glycoluril moiety] |
| Cyanuric Acids | ![cyanuric acid formula] | ![cyanuric acid moiety] | where R' is hydrogen or a hydrocarbyl group and R is hydrogen or a hydrocarbyl group. It should be noted that the disclosure of the above compounds are for illustrative purposes only, and should not be construed as limiting the scope of the present invention.

Non-limiting examples of amide compounds that may be used are acrylamide adipamide, p-toluenesulfonamide, methyl acrylamide and the like.

Examples of urea compounds that may be used in the present invention, include but are not limited to: urea, ethylene urea, dihydroxyethylene urea, dimethylurea and the like.

Non-limiting examples of carbamate compounds that may be used are methyl carbamate, ethyl carbamate, butyl carbamate, trimethyolpropane-triscarbamate, butane diol dicarbamate and the like.

Examples of triazine compounds that may be used in the present invention, include but are not limited to melamine, benzoguanamine, acetoguanamine, cyclohexylguanamine, di- or tri-alkylmelamines and the like.

Non-limiting examples of hydantoin compounds that may be used are hydantoin, methyl hydantoin, ethyl hydantoin, propyl hydantoin, butyl hydantoin and other substituted hydantoins.

Examples of glycoluril compounds that may be used in the present invention, include but are not limited to glycoluril, methyl glycoluril, ethyl glycoluril and other substituted glycolurils.

Non-limiting examples of cyanuric acid compounds that may be used are cyanuric acid, methyl cyanuric acid, ethyl cyanuric acid and other substituted cyanuric acids.

It should also be noted that more than one poly(alkylaldehyde) could react with an amino compound resulting in an oligomer. The term "oligomer" in this application means a compound having 2 or more amino compound repeating units. Preferably, the oligomer has a number average molecular weight of from about 200 to about 5000, or about 600 to about 3000, or about 600 to about 2000.

Preferably, in the above Formula I; B is methylene, ethylene, propylene or a structure of the formula:

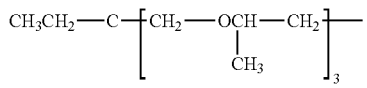

which is the 1,4 Michael addition of crotonaldehyde with trimethylolpropane. Similarly, one may use the reaction product of crotonaldehyde and polyhydritic alcohols, such as glycerol, pentaerythritol, sorbitol, 1,4-butanediol, sugars, starches, cellulose and the like; or adducts and polymers of α, β-unsaturated aldehydes.

Also, preferred is when $R_c$ and $R^C$ are $C_1$ to $C_8$ alkyl, $R_b$ and $R^B$ are $C_1$ to $C_8$ alkyl or $C_1$ to $C_8$ alkoxyalkyl and A and A' are moieties derived from urea, glycoluril or mixtures thereof. Also preferred is when $R_b$ and $R^B$ are independently derived from methanol, ethanol, propanol, isopropanol, butanol, isobutanol, cyclohexanol, phenol, benzyl alcohol, monoalkyl ether of ethylene or propylene glycol and mixtures thereof.

In addition, it is also preferred that about 10% to about 90% of the $R^D$ and $R_d$ groups, or about 15% to about 70%, or about 30% to about 50% of the $R^D$ and $R_d$ groups on a molar basis are $—CHR^COR^B$ and $—CHR_cOR_b$, respectively.

In another embodiment of the present invention, A' and A in Formula I are moieties derived from a mixture of group 1 and group 2 compounds, where group 1 compounds are selected from the group consisting of melamine and guanamine, and group 2 compounds are selected from the group consisting of linear or cyclic ureas, cyanuric acid, substituted cyanuric acids, linear or cyclic amides, glycolurils, hydantoins, linear or cyclic carbamates and mixtures thereof, or a moiety comprising the structure of formula:

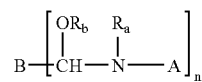

where A, B, $R_a$ and $R_b$ are defined above.

This invention also relates to a process for producing a crosslinking composition comprising reacting an amino compound containing amino groups; a mono(alkylaldehyde) and/or a poly(alkylaldehyde); and an alcohol; where said amino compound is selected from the group consisting of: linear or cyclic ureas, cyanuric acid, substituted cyanuric acids, linear or cyclic amides, glycolurils, hydantoins, linear or cyclic carbamates and mixtures thereof.

In a further embodiment, melamine and/or guanamine may be added in addition to the amino compounds disclosed above.

Non-limiting examples of mono(alkylaldehyde) that may be used in this invention are acetaldehyde, propionaldehyde, n-butyraldehyde, isobutyraldehyde, valeraldehyde, chloral, caproaldehyde, octylaldehyde, acrolein and crotonaldehyde.

Examples of poly(alkylaldehyde) which made be used in this invention include, but are not limited to glutaraldehyde; the reaction product of crotonaldehyde and polyhydritic alcohols, such as glycerol, pentaerythritol, trimethylolpropane, sorbitol, 1,4-butanediol, sugars, starches, cellulose and the like; or adducts and polymers of α, β-unsaturated aldehydes.

Non-limiting examples of alcohols that may be used in this invention are methanol, ethanol, propanol, isopropanol, butanol, isobutanol, cyclohexanol, phenol, benzyl alcohol, monoalkyl ether of ethylene or propylene glycol and mixtures thereof.

In the above reaction, the molar ratio of amino groups in all amino compounds, including guanamine and/or melamine, to mono(alkylaldehyde) is about 1:0.1 to about 1:30, or about 1:0.25 to about 1:10 or about 1:0.5 to about 1:5. In this application "amino groups" include groups with primary and/or secondary amines, i.e., —$NH_2$ and —NHR groups, respectively.

In addition, the molar ratio of amino groups in the amino compounds to aldehyde groups in the poly(alkylaldehyde) is about 0.1:1 to about 50:1, or about 0.5:1 to about 25:1 or about 1:1 to about 10:1.

The molar ratio of aldehyde groups in the mono(alkylaldehyde) and poly(alkylaldehyde) to alcohol is about 1:0.2 to about 1:50, or about 1:0.5 to about 1:5 or about 1:1 to about 1:3.

If guanamine and/or melamine are used in the process, the molar ratio of the guanamine and/or melamine to the amino compound is about 50:1 to about 1:50, or about 20:1 to about 1:20 or is about 10:1 to about 1:10.

It should be noted that the above reactant amounts are a general guide and the actual amount of the reactants will depend on the type of reactants and conditions used to produce the crosslinking composition. Typically, the reaction should be conducted to prevent gelation, which would have a deleterious effect on the crosslinking composition. For example, if the amino compounds contain a large number of amino groups, then a relative small amount of polyfunctional poly(alkylaldehydes) should be used in order to end-cap with amino groups to prevent an insoluble crosslinked gel from forming. Conversely, one can charge a large excess of poly(alkylaldehydes) to effectively end-cap with aldehydes in order to prevent gelation. In addition, higher reaction temperatures could also tend to lead to self-condensation and possibly gelation. One skilled in the art would be able to choose the proper reactant amounts and conditions to reduce or eliminate gel formation.

The above process may be prepared in a one-step or multi-step process. In one embodiment of a multi-step process, the amino compounds are first reacted with the mono(alkylaldehyde) and/or poly(alkylaldehyde) compounds (alkylolation reaction), and then the etherification step would occur by the reaction with an alcohol. In another embodiment of a multistep reaction, the amino compounds are first reacted with a poly(alkylaldehyde) followed by an etherification step, then reacted with a mono(alkylaldehyde) followed by another etherification step.

The alkylolation reaction is preferably conducted in the presence of a catalyst. An acid or base catalyst may be used.

Non-limiting examples of acid catalysts are p-toluenesulfonic acid, sulfamic acid, glacial acetic acid, mono or polychlorinated acetic acids, mono or polyhalogenated acetic acids, sulfuric acid, nitric acid, napthylenesulfonic acid, alkyl phosphonic acids, phosphoric acid and formic acid.

Non-limiting examples of base catalysts are inorganic basic salts such as the hydroxides, carbonates or bicarbonates of lithium, sodium, potassium, calcium and magnesium, or the organic bases and basic salts such as amines and guanidine, quaternary-ammonium or phosphonium hydroxide and (bi-)carbonate salts.

The etherification reaction is preferably conducted in the presence of an acid catalyst. The same acid catalyst described above for the alkylolation reaction may also be used in the etherification reaction.

The reaction is carried out at a temperature from about 0° C. to about 125° C., or about 25° C. to about 100° C. or about 50° C. to about 75° C. for a time of about 0.5 hours to about 48 hours, or about 1 hour to about 24 hours or about 1 hour to about 12 hours.

An important use of the compositions described herein is based on their ability to act as crosslinking agents in curable compositions, and especially those curable compositions which contain materials or polymers having active hydrogen groups. The crosslinkers of the present invention are capable of crosslinking active hydrogen containing materials or polymers.

The active hydrogen-containing material of the curable compositions preferably contains at least one class of a reactive functionality such as hydroxy, carboxy, amino, amido, carbamato, mercapto, or a blocked functionality which is convertible to any of the preceding reactive functionalities. These active hydrogen-containing materials are those which are conventionally used in amino resin coatings, and in general are considered well-known to those of ordinary skill in the relevant art.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the condensation of epoxy compounds with an amine, and mixtures thereof. Acrylic and polyester resins are preferred. Examples of the polyfunctional hydroxy group containing materials include DURAMAC® 203-1385 alkyd resin (Eastman Chemical Co.); Beckosol® 12035 alkyd resin (Reichhold Chemical Co. Durham, N.C.)JONCRYL® 500 acrylic resin (S. C. Johnson & Sons, Racine, Wis.); AT-400 acrylic resin (Rohm & Haas, Philadelphia, Pa.); CYPLEX® polyester resin (Cytec Industries, West Paterson, N.J.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers (Port Washington, Wis.); CRYLCOAT® 3494 solid hydroxy terminated polyester resin (UCB CHEMICALS USA, Smyrna, Ga.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.); and the like.

Examples of carboxyfunctional resins include CRYLCOAT® solid carboxy terminated polyester resin (UCB CHEMICALS USA, Smyrna, Ga.). Suitable resins containing amino, amido, carbamato or mercapto groups, including groups convertible thereto, are in general well-known to those of ordinary skill in the art and may be prepared by known methods including copolymerizing a suitably functionalized monomer with a comonomer capable of copolymerizing therewith.

The curable compositions of the present invention may optionally further comprise a cure catalyst. The cure catalysts usable in the present invention include sulfonic acids, aryl, alkyl, and aralkyl sulfonic acids; aryl, alkyl and aralkyl acid phosphates; aryl, alkyl and aralkyl acid pyrophosphates; carboxylic acids; sulfonimides; mineral acids and a mixture thereof. Of the above acids, sulfonic acids are preferred when a catalyst is utilized. Examples of the sulfonic acids include benzenesulfonic acid, para-toluenesulfonic acid, dodecylbenzenesulfonic acid, naphthalenesulfonic acid, dinonylnaphthalenedisulfonic acid, and a mixture thereof. Examples of the aryl, alkyl and aralkyl phosphates and pyrophosphates include phenyl, para-tolyl, methyl, ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of the carboxylic acids include benzoic acid, formic acid, acetic acid, propionic acid, butyric acid, dicarboxylic acids such as oxalic acid, fluorinated acids such as trifluoroacetic acid, and the like. Examples of the sulfonimides include dibenzene sulfonimide, di-para-toluene sulfonimide, methyl-para-toluene sulfonimide, dimethyl sulfonimide, and the like. Examples of the mineral acids include nitric acid, sulfuric acid, phosphoric acid, poly-phosphoric acid, and the like.

The curable composition may also contain other optional ingredients such as fillers, light stabilizers, pigments, flow control agents, plasticizers, mold release agents, corrosion inhibitors, and the like. It may also contain, as an optional ingredient, a medium such as a liquid medium to aid the uniform application and transport of the curable composition. Any or all of the ingredients of the curable composition may be contacted with the liquid medium. Moreover, the liquid medium may permit formation of a dispersion, emulsion, invert emulsion, or solution of the ingredients of the curable composition. Particularly preferred is a liquid medium, which is a solvent for the curable composition ingredients. Suitable solvents include aromatic hydrocarbons, aliphatic hydrocarbons, halogenated hydrocarbons, ketones, esters, ethers, amides, alcohols, water, compounds having a plurality of functional groups such as those having an ether and an ester group, and a mixture thereof.

Preferably, the weight ratio of the active hydrogen-containing material to the crosslinking composition is in the range of from about 99:1 to about 0.5:1 or about 10:1 to about 0.8:1 or about 4:1 to about 0.8:1.

The weight percent of the cure catalyst, if present, is in the range of from about 0.01 to about 3.0 wt % based on the weight of the crosslinker and active hydrogen-containing material components.

The present coating compositions may employ a liquid medium such as a solvent, or it may employ solid ingredients as in powder coatings, which typically contain no liquids. Contacting may be carried out by dipping, spraying, padding, brushing, rollercoating, flowcoating, curtaincoating, electrocoating or electrostatic spraying.

The liquid or powder coating compositions and a substrate to be coated are contacted by applying the curable composition onto the substrate by a suitable method, for example, by spraying in the case of the liquid compositions and by electrostatic spraying in the case of the powder compositions. In the case of powder coatings, the substrate covered with the powder composition is heated to at least the fusion temperature of the curable composition forcing it to melt and flow out and form a uniform coating on the substrate. It is thereafter fully cured by further application of heat, typically at a temperature in the range of about 120° C. to about 220° C. for a period of time in the in the range of about 5 minutes to about 30 minutes and preferably for a period of time in the range of 10 to 20 minutes.

In the case of the liquid compositions, the solvent is allowed to partially evaporate to produce a uniform coating on the substrate. Thereafter, the coated substrate is allowed to cure at temperatures of about 20° C. to about 150° C., or about 25° C. to about 120° C. for a period of time in the in the range of about 20 seconds to about 30 days depending on temperature to obtain a cured film. In a particularly advantageous embodiment, coating compositions formulated with crosslinker containing compositions of the present invention can be heat cured at lower temperatures preferably ranging from about 20° C. to about 90° C.

The heat cured compositions of this invention may be employed in the general areas of coatings such as original equipment manufacturing (OEM) including automotive coatings, general industrial coatings including industrial maintenance coatings, architectural coatings, powder coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics, wood and glass.

The curable compositions of the present invention are particularly well suited to coat heat sensitive substrates such as plastics and wood which may be altered or destroyed entirely at the elevated cure temperatures prevalent in the heat curable compositions of the prior art.

The present invention will now be illustrated by the following examples. The examples are not intended to limit the scope of the present invention. In conjunction with the general and detailed descriptions above, the examples provide further understanding of the present invention.

EXAMPLES

Example 1

Preparation of Glycoluril-Urea Alkylaldehyde Resin

Into a suitable flask was placed 1.5 grams of $Na_2CO_3$ and 139 grams of water at room temperature. To the well-stirred solution was added 150 grams of a 50% aqueous glutaraldehyde solution. The temperature was reduced and maintained at approximately 25° C. by cooling in an ice bath whereby 72.5 grams of propionaldehyde and then 35.5 grams of glycoluril was added with stirring. The temperature was then increased to approximately 35° C. and held at that temperature until the solution became clear. Approximately 30 grams of urea was then added and the reaction was allowed to react for approximately 0.5 hours.

After this time, 250 grams anhydrous MeOH with 2.5 grams of added 97% $H_2SO_4$ was added to the mixture with stirring, and the temperature was maintained at 25° C. (ice bath) for about 1 hour. The reaction mixture was then neutralized with 50% NaOH to pH 8 to 8.2. The reaction mixture was then stripped under good vacuum at a temperature of about 40° to 50° C. to remove all the MeOH and as much water as possible. After stripping, about 36 grams of propionaldehyde was added and the reaction mixture was warmed to a temperature of about 40° C.

The reaction mixture was then subjected to a second alkylation with 250 grams anhydrous MeOH with 2.0 grams added $H_2SO_4$ for approximately 1 hour at 25° to 30° C. After this period, the batch was neutralized with NaOH to pH 8 to 8.2 and then was stripped under good vacuum to remove the remaining methanol and water with at a temperature of about 55° to 60° C. The resin was then adjusted to approximately 60% solids with 50% by weight ethanol in toluene and filtered free of $Na_2SO_4$ salts. The resin had a $^{13}C$ NMR and IR spectrum, consistent with the expected composition and was found to contain 69.6% solids.

Example 2

Coating Composition Containing Glycoluril-Urea Alkylaldehyde Resin

A coatings formulation was prepared with the crosslinking resin of Example 1 by adding 3.0 grams of Dynotol® T-49emp alkyld backbone resin (85% solids in alcohol) to 3.0 grams of the crosslinking resin of Example 1, 0.3 grams of CYCAT® 4040 catalyst (40.0% para-toluenesulfonic acid monohydrate in isopropyl alcohol) and 1.0 gram of acetone solvent. The formulation was applied as a thin film, approximately 2 mils thick, with a wire wound cator (#52) to iron phosphate treated cold roll steel panels. The panels were then allowed to cure at room temperature (23° to 25° C.) for seven days. The films did not discolor and had greater than 100 double rubs methyl ethyl ketone (MEK) solvent resistance. A control panel without the crosslinking resin containing Dynotol T-49emp plus 0.3 grams of CYCAT 4040 catalyst and 1.0 gram of acetone solvent had less than 3 MEK double rubs solvent resistance and were yellowed.

Example 3

Preparation of Melamine-Urea Alkylaldehyde Resin

To a suitable flask was charged 35 grams of water and 0.50 grams of $K_2CO_3$. The resulting solution was warmed to 40° C. and 30.0 grams of urea was charged and allowed to dissolve with good stirring. To this reaction mixture was charged 12.6 grams of melamine with good stirring. To this slurry was slowly added 40.6 grams of propionaldehyde keeping the temperature below 55° C. to 57° C. After complete addition, the reaction mixture was refluxed for one hour and then 30.0 grams of 50% glutaraldehyde was added after cooling to room temperature. After stirring several hours at room temperature (22° to 25° C.), the reaction mixture became homogenous and 135 grams of anhydrous methanol was added and the pH adjusted to 4.3 with 5.5 grams of 70% $HNO_3$. The batch was allowed to react at room temperature for about one hour and then the pH was adjusted to 8.1 with 5.5 grams of 50% NaOH. The batch was then stripped under good vacuum to remove the excess methanol and as much of the water as possible at a temperature of about 40° to 50° C. To this product was added another 30.0 grams of 50% glutaraldehyde and two drops of 50% NaOH. The mixture was vacuum stripped until 12.2 grams more of water was removed. To the resulting reaction mixture was added a second 135 gram of anhydrous methanol with good stirring keeping the temperature at between 35° to 40° C. To the stirred solution was added 5.0 grams of 70% $HNO_3$ resulting in a pH of approximately 4.0. The reaction was allowed to continue at 35° to 40° C. for 30 minutes and then the pH was adjusted with about 4.4 grams of 50% NaOH to pH 8.5. The batch was then stripped under good vacuum to remove the excess water and methanol to a terminating temperature of 50° C. A 1:1 wt/wt toluene-ethanol solvent was then added to reduce the solids content to 60 wt.%. The mixture was then filtered to obtain the crosslinking resin. The resin had a $^{13}C$ NMR and IR spectrum, consistent with the expected composition and had found solids content of 57.1%.

Example 4

Coating Composition Containinq Melamine-Urea Alkylaldehyde Resin

A coatings formulation was made by adding 3.0 grams of Dynotol T-49emp Alkyd Resin to 3.0 grams to the crosslinking resin of Example 3, 0.3 grams of CYCAT 4040 and 1.5 grams of acetone solvent. A thin film (approximately 2 mils) was applied to iron-phosphate treated cold rolled steel panels and allowed to cure for seven days at room temperature (23° to 25° C.). The films did not discolor and had greater than 180 MEK double rub solvent resistance. A control formulation with no crosslinker discolored and had no solvent resistance.

Example 5

Preparation of Glycoluril Alkylaldehyde Resin

To a suitable flask was charged 0.6 grams of $Na_2CO_3$ and 10.0 grams of water. To this stirred solution at approximately 22° C. was added 116 grams of propionaldehyde and 20.0 grams of water. To the well-stirred reaction mixture was added 14.2 grams of glycoluril. The mixture was allowed to stir at about 25° C. for 4.5 hours after which time virtually all the glycoluril had reacted and dissolved. To the stirred reaction mixture was added 20 grams of 50% aqueous glutaraldehyde and the mixture was allowed to stir at room temperature for 2 hours. After this time, excess propionaldehyde was removed from the batch by slight vacuum distillation with a terminal temperature of approximately 35° C. To the remainder of the batch was charged 100 grams of anhydrous MeOH containing 1.0 gram of 97% $H_2SO_4$ slowly, keeping the temperature between about 15° to 20° C. with a cold water bath. After complete addition, the batch was warmed to 22° to 25° C. and allowed to stir for one hour. The pH was then adjusted with 1.55 grams of 50% NaOH to pH 8.5 and stripped under good vacuum to remove nearly all excess MeOH and water at terminating temperature of 45° C. The reaction mixture was then subjected to a second alkylation with another 100 grams of methanol containing 1.33 grams of 97% $H_2SO_4$. The batch was then allowed to stir for one hour after which 1.44 grams of 50% NaOH was added adjusting the pH to 8.5. The batch was then stripped free of excess MeOH and water under good vacuum with terminating temperature of about 50° C. The batch was then adjusted to approximately 50% solids with 1:1 (wt/wt) ethanol-toluene solvent mixture and filtered to obtain the crosslinking resin. The resulting resin a $^{13}C$ NMR and IR spectrum, consistent with the expected composition and was found to be 47.4% solids.

Example 6 to 7

Coating Formulation Comparisons

Coating Compositions containing the resin of Example 5 was compared with a formulation based on a commercial urea-formaldehyde crosslinking resin. These formulations are shown below in Table 1.

TABLE 1

| Formulations | Example 6C | Example 6 | Example 7 |
|---|---|---|---|
| DURAMAC ® 304-1385 alkyd resin | 82.4 | 70.6 | 70.6 |
| Commercial urea-formaldehyde resin (78% solids) | 38.5 | — | — |
| Example 5 resin (47.5% solids) | — | 84.2 | 84.2 |
| Ethanol/Butanol (1:1) | 23.2 | 23.2 | 23.2 |
| BYK 333 (Flow control) | 0.5 | 0.5 | 0.5 |
| CYCAT 4040 (catalyst) | 7.5 | 7.5 | — |
| CYCAT 600 (catalyst) | — | — | 4.3 |
| Ethanol/Butanol (1:1) | 23.0 | — | — |
| Total | 175.1 | 186.0 | 182.8 |
| Ratio alkyd/aminoplast | 70/30 | 60/40 | 60/40 |
| Theoretical solids (%) | 58.9 | 55.4 | 56.4 |

Cycat ® 600 is dodecylbenzene sulfonic acid catalyst

Coatings were prepared using the above formulations, dried at ambient temperature and had their König hardness measured under the condition described below:
Application method: Block application 150 microns wet
Substrate: Glass panel
Curing schedule: Climate room at 22°-23° C. and 50-55% RH The König Hardness measurements collected from the coatings are shown in Table 2 below.

TABLE 2

König Hardness measurements at room temperature cure

| Hardness by König, sec | Example 6C | Example 6 | Example 7 |
|---|---|---|---|
| After 1 hour | 15 | 13 | 11 |
| After 2 hours | 20 | 30 | 18 |
| After 4 hours | 54 | 60 | 32 |
| After 6 hours | 72 | 74 | 38 |
| After 24 hours | 92 | 93 | 50 |
| After 48 hours | 91 | 101 | 63 |
| After 168 hours | 97 | 115 | 80 |
| After 336 hours | 98 | 120 | 100 |
| After 504 hours | 107 | 128 | 113 |
| After 672 hours | 100 | 129 | 115 |

König Hardness measurements were also performed on coatings prepared from the formulations of Examples 6, 6C and 7 that were cured at an elevated temperature of 50° C. for 60 minutes under the conditions described below:
Application method: Block application 150 microns wet
Substrate: Glass panel
Curing schedule: 60 min. at 50° C. then climate room at 22° to 23° C. and 50% to 55% RH After the coating was baked at 50° C. for 60 minutes, the samples were allowed to cool and the first direct measurement was collected. The samples were then placed in the climate-controlled room for subsequent periodic hardness measurements as shown in Table 3 below.

TABLE 3

König Hardness measurements at 50° C. cure

| Hardness by König, sec | Example 6C | Example 6 | Example 7 |
|---|---|---|---|
| Direct | 84 | 89 | 42 |
| After 24 hours | 86 | 99 | 55 |
| After 48 hours | 95 | 109 | 63 |
| After 168 hours | 100 | 118 | 71 |
| After 336 hours | 107 | 127 | 79 |

TABLE 3-continued

König Hardness measurements at 50° C. cure

| Hardness by König, sec | Example 6C | Example 6 | Example 7 |
|---|---|---|---|
| After 504 hours | 114 | 131 | 78 |
| After 672 hours | 113 | 131 | 77 |

Comparison of Examples 6 and 6C demonstrates that the coatings prepared using an example of the formaldehyde-free crosslinking resin of the present invention has superior performance over the commercial crosslinking resin of Example 6C.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A crosslinking composition comprising the structure of Formula I:

$$A'\text{-}NR^A\text{---}R^D \qquad \text{(Formula 1)}$$

wherein A' represents a moiety from Group 2 optionally mixed with a moiety from Group 1; wherein
Group 1 consists of: a mono or divalent moiety derived from melamine or guanamine; and
Group 2 consists of:
(a) a monovalent or divalent moiety of a compound selected from linear ureas, cyclic ureas, cyanuric acid, substituted cyanuric acids, linear amides, cyclic amides, glycolurils, hydantoins, linear carbamates, cyclic carbamates and mixtures thereof, and
(b) a moiety of Formula 2:

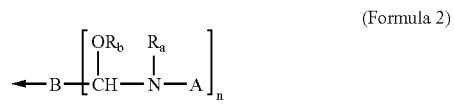

(Formula 2)

$R^A$ is selected from: $R^D$, hydrogen, $C_{1-20}$alkyl, and where $R^A$ taken together with A' is a divalent moiety (together forming a cyclic compound when attached to the nitrogen in Formula 1); $R^A$ is selected from divalent $R^D$, a bond and $C_{1-20}$alkylene;
$R^D$ is <—$CHR^C OR^B$, wherein
$R^B$ is selected from: $C_{1-24}$alkyl, $C_{3-24}$aryl, $C_{4-24}$aralkyl and $C_{4-24}$alkaryl; and
$R^C$ is selected from: optionally halogenated $C_{1-24}$alkyl; $C_{3-24}$aryl, optionally halogenated $C_{4-24}$aralkyl; $C_{2-24}$alkoxyalkyl, and $C_{4-24}$alkaryl, and
A is a monovalent or divalent moiety of a compound selected from: linear ureas, cyclic ureas, cyanuric acid, substituted cyanuric acids, linear amides, cyclic amides, glycolurils, hydantoins, linear carbamates, cyclic carbamates and mixtures thereof;
B represents a mixture of residues from propionaldehyde and from glutaraldehyde;

$R_a$ is selected from: $R_d$, hydrogen, $C_{1-20}$alkyl and where $R_a$ taken together with A forms a cyclic compound; and $R_b$ selected from: $C_{1-24}$alkyl, $C_{3-24}$aryl, $C_{4-24}$aralkyl and $C_{4-24}$alkaryl; wherein $R_d$ is selected from: a radical <—$CHR_cOR_b$ and a moiety of Formula 3:

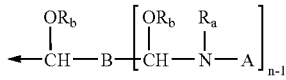

Formula 3

$R_c$ is selected from: optionally halogenated $C_{1-24}$alkyl ;

$C_{3-24}$aryl; optionally halogenated $C_{4-24}$aralkyl; $C_{2-24}$alkoxyalkyl; and $C_{4-24}$alkaryl;

and wherein the alkyl and aryl groups in each radical may optionally have heteroatoms in their structure.

2. The composition of claim 1, wherein said compound having the Formula 1 is an oligomer having a number average molecular weight of from about 200 to about 500.

3. The composition of claim 1, wherein A and A' are each independently moieties derived from a mixture of ureas and glycolurils.

4. The composition of claim 1, wherein A and A' are each independently moieties derived from a mixture of melamine, urea and glycoluril.

5. A process for producing the cross-linking composition of claim 1, comprising reacting:

(i) an amino group containing compound selected from: linear ureas, cyclic ureas, cyanuric acid, substituted cyanuric acids, linear amides, cyclic amides, glycolurils, hydantoins, linear carbamates, cyclic carbamates and mixtures thereof;

(ii) a mixture of propionaldehyde and glutaraldehyde;

(iii) an alcohol; and (iv) optionally a melamine and/or guanamine.

6. The process of claim 5 wherein said amino group containing compounds are a mixture of ureas and glycolurils.

7. The process of claim 5 wherein said ingredients (i) and (iv) are together a mixture of melamine, urea and glycoluril.

8. The process of claim 5, wherein said alcohol is selected from the group consisting of: methanol, ethanol, propanol, isopropanol, butanol, isobutanol, cyclohexanol, phenol, benzyl alcohol, monoalkyl ether of ethylene glycol, monoalkyl ether of propylene glycol and mixtures thereof.

9. The process of claim 5, wherein the molar ratio of the amino groups of said ingredient (i) and said ingredient (iv) where present to the propionaldehyde of said ingredient (ii) is from 1:0.1 to 1:30; the molar ratio of amino groups of said ingredient (i) and said ingredient (iv) where present to the aldehyde groups in the glutaraldehyde of said ingredient (ii) is from 0.1:1 to 50:1; and the molar ratio of aldehyde groups in said ingredient (ii) to said ingredient (iii) is from 1:0.2 to 1:50.

10. A curable composition comprising:

(i) the cross-linking composition of claim 1;

(ii) an active-hydrogen containing material; and (iii) optionally a cure catalyst.

* * * * *